United States Patent

[11] 3,529,523

| [72] | Inventor | Stanley W. Haskell |
| | | Arlington, Massachusetts |
| [21] | Appl. No. | 694,715 |
| [22] | Filed | Dec. 29, 1967 |
| [45] | Patented | Sept. 22, 1970 |
| [73] | Assignee | Polaroid Corporation |
| | | Cambridge, Massachusetts |
| | | a corporation of Delaware |

[54] EXPOSURE CONTROL SYSTEM
9 Claims, 6 Drawing Figs.

| [52] | U.S. Cl. | 95/10 |
| [51] | Int. Cl. | G01j 1/00 |
| [50] | Field of Search | 95/10; |
| | | 355/46 |

[56] References Cited
UNITED STATES PATENTS

| 1,783,998 | 12/1930 | Chretien | 355/46X |
| 3,401,594 | 9/1968 | Daugherty | 355/46 |

*Primary Examiner*—John M. Horan
*Attorneys*—Brown and Mikulka, William D. Roberson and Leonard S. Selman ABSTRACT: An optical conversion unit for use with an electrically powered exposure control system of a variety incorporating an array of photocells. The unit comprises a molded transparent element, one face of which is configured having a relatively long focal length lens for imaging scene light over the entire array of photocells. The unit is positioned for imaging through this lens during daylight operation of the system. For flash operation, the opposite side of the optical conversion unit incorporates an array of relatively short focal length lenses corresponding to the array of photocells. The latter lenses serve to image the entire scene being photographed upon each photocell individually.

Patented Sept. 22, 1970
3,529,523
Sheet 1 of 2
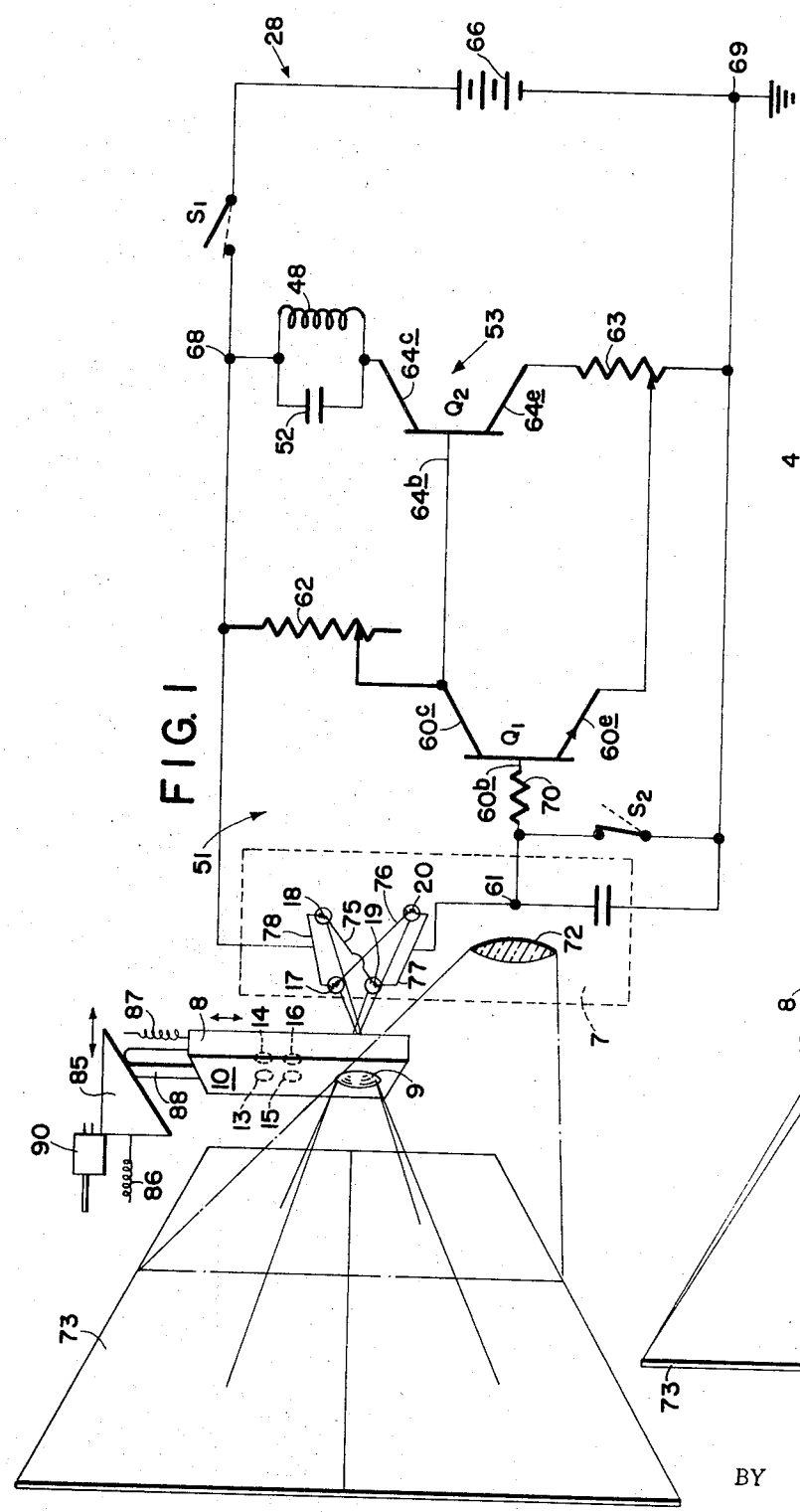
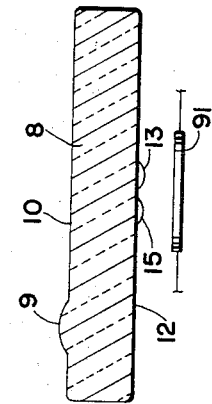
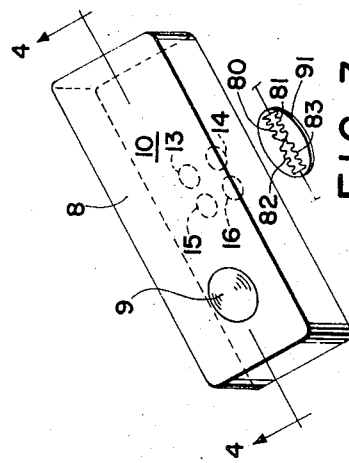
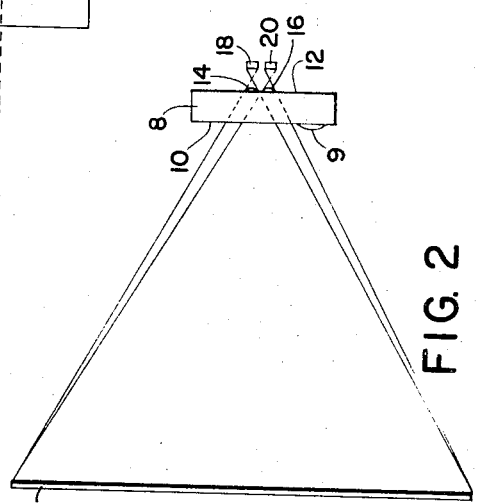
INVENTOR.
Stanley W. Haskell
BY
Brown and Mikulka
and
Leonard S. Selman
ATTORNEYS

EXPOSURE CONTROL SYSTEM

CROSS REFERENCE TO RELATED APPLICATIONS

The invention disclosed herein is related to the subject matter disclosed in copending applications; Ser. No. 607,476 filed January 5, 1967, now U.S. Pat. No. 3,473,453, and Ser. No. 624,774 filed March 21, 1967, now U.S. Pat No. 3,511,142, which are both assigned to the same assignee as the present application.

BACKGROUND AND SUMMARY OF THE INVENTION

An exposure control system has been proposed wherein a group of four photosensitive elements are connected in a series-parallel arrangement in an exposure control circuit. The light falling upon the photosensitive elements is directed by means of an element having means to image the light from just a quarter segment of the scene on each photocell in the daylight mode but in the flash mode another portion of the element containing four separate lenses images the light from the entire scene on each photocell individually. The imaging means of the present invention comprises an integral molded optical element which may be manufactured in a single molding step. The imaging means imcludes a relatively long focal length lens which is molded into the front surface of the element and which images the scene on the photosensitive elements in so that in the daylight mode one quarter of the scene image falls on each photosensitive element. Four relatively short focal length lenses are located on the back surface of the molded element and each of these lenses images the entire scene on each photocell individually in the flash mode. The refractive index of the material the imaging element is composed of and the focal length of each lens are such that the images formed by each of the short focal length lenses and the long focal length lens fall on the single plane in which the photosensitive surfaces are located. Mechanical means are provided for switching the imaging element from the daylight mode in which the single lens is positioned in front of the photosensitive surface arrangement to the flash mode in which the four lenses are so positioned. Thus in a simple easy to manufacture structure these important imaging functions are accomplished greatly improving the performance of the entire exposure control system.

Accordingly, it is an object of the invention to provide an exposure control system which includes in an integral molded structure means for imaging the light from the scene for both the daylight and flash modes of operation.

It is a further object of the invention to provide an exposure control system including an imaging means comprising an integral molded optical element including a plurality of lenses.

It is another object of the invention to provide an exposure control system including an imaging means which comprises a lens on the front surface of a molded transparent optical element and a plurality of lenses on the rear surface thereof.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

FIG. 1 is a schematic electrical diagram of the present invention including a representation of the photosensitive elements incorporated into the camera receiving light from the scene to be photographed and the imaging means positioned in front of said photosensitive elements.

FIG. 2 is a fragmentary schematic plan view of the scene to be photographed, the imaging means and a plurality of photosensitive elements.

FIG. 3 is a perspective view of the imaging means removed from the camera and a plurality of photosensitive elements positioned behind it.

FIG. 4 is a cross-sectional view taken along line 4—4 of FIG. 3.

DESCRIPTION OF THE PREFERRED EMBODIMENT

Figure 5:
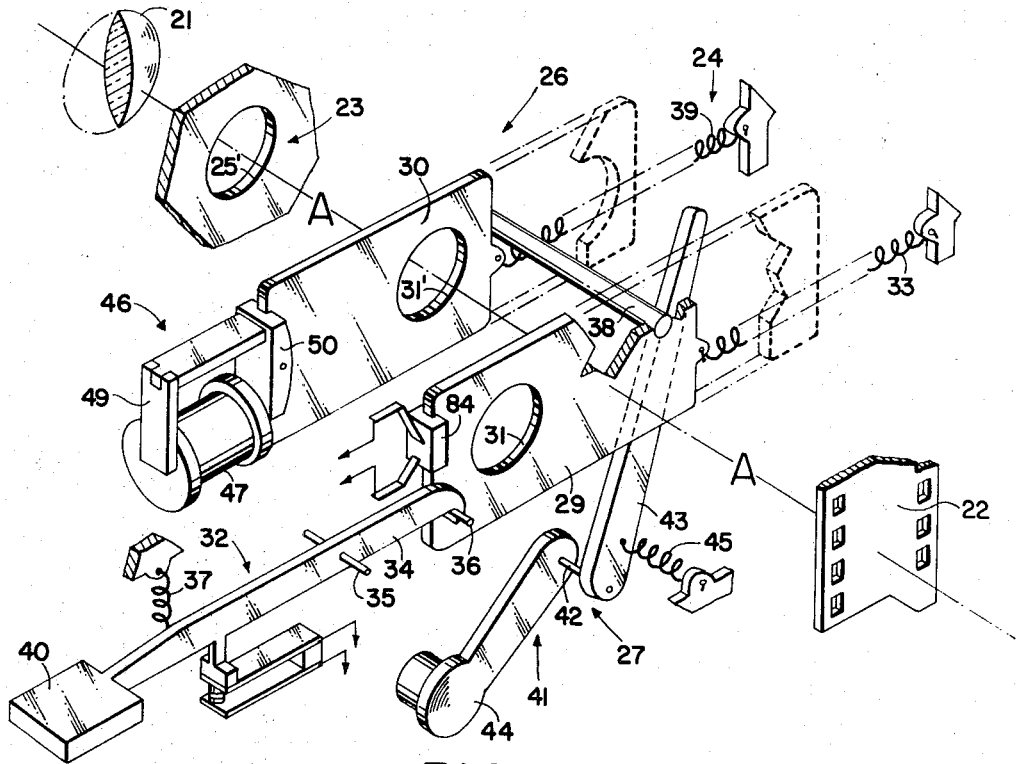
FIG. 5 is a schematic representation of a camera of a type particularly well adapted for use with the present invention.

The exposure control system of the present invention may control either the exposure interval or the size of the diaphragm opening, or both, to achieve the proper exposure factor for a particular scene to be photographed.

In the preferred embodiment of the invention, the exposure is regulated by means of a shutter control means to be described. The shutter control means is shown in the drawing as embodied into a camera having a particular type of mechanical shutter but the latter is for the purpose of illustrating the invention in a representative environment it being understood that other types of shutter means could also be used with the shutter control means disclosed in order to derive the new and improved results attendant thereto.

The term "photosensitive element" as used in the specification and claims should be understood to include any photosensitive element having a conductive parameter which varies in accordance with the light incident thereon, such as photodiodes and phototransistors.

The exposure control system as shown in FIG. 1 comprises an electrical circuit which includes four photosensitive elements which receive light from the scene being photographed and which vary in their "conductance" or the amount of electrical current that they will conduct, in accordance with the quantity of light incident thereon. These four photosensitive elements form a network in which the pairs of elements receiving light from diagonally opposite portions of the picture area in the daylight mode as shown in FIG. 1, are connected in series across the terminals of network.

In this daylight mode due to the nature of the photosensitive elements the one element of the series connected pair receiving light from a darker portion of the scene will be much less conductive of electric current than the photosensitive element receiving light from a brighter portion of the scene. This is true of both pairs of series connected photosensitive elements shown in FIG. 1 and it may also be said that the network 7 has a combined electrical parameter of conductance which is affected to a greater extent in the daylight mode by those photosensitive elements which receive light from the darker portions of the scenes rather than the brighter portions. This arrangement prevents small bright areas of the scene which may be present to have a dominating effect on the conductance of the network so that an exposure may result which will bring out the detail in the darker areas of the final picture obtained.

In the flash mode, however, a different situation exists. The subjects of most interest in flash photography are generally closest to the light source and since brightness decreases inversely with a certain function with the distance (without reflector this would be the inverse square law) these subjects receive consequently the most amount of illumination. Therefore, it is desirable to provide a means whereby conductance of the network of photosensitive elements shown in FIG. 1 may be converted to a flash mode wherein the network conductance may be effected to a greater extent by those photosensitive elements receiving light from the brighter portions of the scene. One way this may be accomplished which has been proposed is to provide a means which is operable to switch the series-connected pairs of photosensitive elements to an arrangement where each of said elements is connected in parallel across the terminals of network 7. Thus, the relatively higher conductance of those elements which receive light from the brighter portions of the scene will not be affected by the relatively low conductance of those elements receiving light from the darker portions. The network conductance will then be effected to a greater extent by those elements receiving the greater amount of light which will result in the most satisfactory exposure for flash photography.

The present invention shows another means for converting the network from the daylight to the flash mode. As shown in FIGS. 1 and 2 the exposure control system includes an imaging element 8 which contains a relatively long focal length lens 9 on front surface 10 which as shown schematically in FIG. 1 images the scene 11 on the network of photosensitive elements such that in the daylight mode the light from the four separate segments of the scene are imaged separately on the respective elements. The series connections of the diagonal elements will thus cause the exposure to be effected by the darker portions as explained above. Adjacent the other end of element 8 and on the back surface 12 thereof are located the four relatively short focal length lenses 13, 14, 15 and 16 which are positioned over the photosensitive element network as shown in FIG. 2 in the flash mode, with each lens imaging the entire scene on each photosensitive element individually. Thus each photosensitive element, even those connected in series with another, in the flash mode, will have its conductance effected primarily by the brighter portions of the scene rather than the darker portions which appear in the scene being photographed and the combined conductance of the network will similarly be effected primarily by said brighter portions while in the flash mode.

FIGS. 3 and 4 show the imaging element 8 removed from the camera and in cross section. It is an important feature of the invention that the images from either the larger lens 9 or the four smaller lenses 13, 14, 15 and 16 are formed in the single plane containing the light responsive surfaces of the photosensitive elements. This is accomplished by positioning the relatively long focal length lens on the front surface as shown and the smaller lenses on the back surface and spaced the exact distance so that the images formed on each individual cell of the entire scene will be the same as the image formed by the longer focal length lens which falls on the four photosensitive elements so that each receives one quarter of the light of the entire scene image. The material that the molded element is composed of in the preferred embodiment is methyl methacrylate. Element 8 is relatively thick; for example, the thickness of the element is greater than the distance from the rear surface thereof to the single plane in which the images of the lenses 9, and 13, 14, 15 and 16 are formed on the photosensitive surfaces of the photosensitive elements. The thickness of element 8 is also considerably larger than the radius of curvature of any of the lenses including lens 9 as shown in FIG. 4. As shown in FIG. 3 the outer lens surfaces of each of the lenses are spherical in shape with the focal length of the lens 9 approximately twice the focal length of the smaller lenses.

An example of one specific embodiment of the imaging means 8 has thickness of .220 inches and the radius of curvature of lens 9 is .142 inches and each of the lenses 13, 14, 15 and 16 has a radius of curvature of .071 inches. The distance from the rear surface to the plane in which the scene images are formed is .154 inches.

The network 7 composed of the series-parallel arrangement of photosensitive elements 17, 18, 19 and 20 are only a part of the larger electrical network shown in FIG. 1. This larger electrical network controls the exposure system of camera 26, shown schematically in FIG. 5 which includes lens 21 for receiving light from a scene being photographed, and focusing it through an aperture in diaphragm means 23 onto film 22 to effect exposure of the latter by the proper operation of shutter mechanism 24 which is interposed in the optical path of the light.

Diaphragm 23 may take the form of a disc 25 mounted on the camera housing. Disc 25 contains exposure aperture 25' of preselected area aligned with the optical axis of A—A of the camera.

Shutter mechanism 24 may include shutter means 27, and shutter control means 28 as shown in FIG. 1. Shutter means 27 may take the form of a pair of planar, opaque blades 29 and 30 each provided with an exposure orifice 31 and 31', and mounted in tracks (not shown) so as to be normal to the optical axis, and reciprocable between terminal positions into intersection therewith. Each of the blades has one terminal position at which the solid portion overlies and totally blocks the exposure aperture in diaphragm means 23 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be.

The blade 29 that causes exposure to be initiated is called the "opening" blade. The initial terminal position at which the opening blade is closed is termed the "blocking" position, while the position intermediate the two terminal positions of the opening blade at which it initiates exposure is termed the "unblocking" position. Conversely, the blade 30 that causes exposure to be terminated is called the "closing" blade. The initial terminal position at which the closing blade is open is termed the "unblocking" position, while the position intermediate the two terminal positions of the closing blade at which it terminates exposure is termed the "blocking" position.

Prior to initiation of exposure, the blades are as shown in the solid lines of FIG. 5, inspection of which will indicate that releasable coupling means 32 is engaged with opening blade 29 to hold the latter in blocking position against the bias of spring means 33 which urges the blade toward unblocking position. Coupling means 32 includes lever 34 pivotally mounted on pin 35 and engaged with latch pin 36 attached to blade 29. Latch spring 37 engaged with lever 34 urges the latter into latching contact with pin 36. Reset bar 38 is rigidly attached to the end of blade 29 opposite exposure orifice 31, and extends normal thereto into the path of movement of closing blade 30. When the opening blade is held in blocking position by coupling means 32, bar 38 is effective to engage blade 30 to maintain the latter open position against the bias of spring means 39 urging the closing blade toward its blocking position. As can be seen from the drawing, bar 38 does not interfere with the independent movement of opening blade 29 to its open position.

Such movement takes place upon manual depression of end portion 40 of lever 34, which rotates the latter about pivot 35 out of engagement with pin 36. Upon disengagement of coupling means 32 from opening blade 29, the latter moves out of blocking position toward open position, and bar 38 is no longer effective to maintain closing blade 30 in its open position. However, initial movement of opening blade 29, in response to the disengagement of coupling means 32 therefrom, is effective to cause shutter control means 28, in a manner to be described later, to retain closing blade 30 in its open position for a preprogrammed period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preprogrammed period of time, shutter control means 28 causes closing blade 30 to be released thus terminating exposure when the latter is moved from open to blocking position by the action of bias spring means 39.

When exposure is terminated, blades 29 and 30 are in the position shown by the broken lines of FIG. 5. That is to say, blade 29 is in open position and blade 30 is in blocking position, with reset bar 38 again engaged with blade 30. Having completed the exposure cycle, the blades are returned to their normal positions by reset mechanism 41 which includes reset shaft 42 rotatably mounted on the camera housing, reset lever 43 rigidly fixed to one end of shaft 42 and manual reset actuator 44 rigidly fixed to the other end of the shaft. Spring means 45 biases lever 43 to its normal position out of the path of movement of reset bar 38. However, the manual rotation of lever 43 against spring 45, achieved by the manual rotation of actuator 44 after exposure is terminated, causes lever 43 to engage bar 48 and move both blade 29 and blade 30 back to their normal, pre-exposure positions wherein the opening blade is in blocking position and the closing blade is in open position, the blades being held there by the action of coupling means 32. Upon release of actuator 44, lever 43 returns to its normal position, and the mechanism is ready for the next exposure cycle. If desired, the manual rotation of actuator 44 can be coupled to a film indexing mechanism.

Shutter control means 28 includes shutter operator means 46 actuatable to cause shutter means 27 to initiate exposure, and deactuatable after said preselected period of time to cause the shutter means to terminate exposure, as previously described. Specifically, operator means 46 may take the form of an electromagnet 47 which has solenoid 48, see FIG. 5, wound around one leg of U-shaped pole-piece 49, the free ends of which are coplanar and cooperable with magnetizable keeper 50 mounted on closing blade 30. When the latter is in open position, pole-piece 49 and keeper 50 define a magnetic circuit of a particular reluctance, such that a preselected magnetomotive force resulting from the solenoid current is sufficient to establish an attractive force between the pole-piece 49 and the keeper 50 that exceeds the separating force exerted on the closing blade by the biasing action of spring means 39 and is sufficient to resist dynamic loads due to the shock of the bottoming of the opening blade.

Shutter control means 28 further includes shutter timing apparatus 51, the purpose of which is to furnish an energizing current to the solenoid 48 of electromagnet 47. If the camera is to be portable and battery operated, it is important to minimize current drain on the battery. With this in mind, premature release of closing blade 30 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid 48 should be energized before opening blade 29 begins to move out of unblocking position, because this blade, through bar 38, serves initially to position keeper 50 in engagement with pole-piece 49. Once the keeper separates even slightly from the pole-piece, the reluctance of the magnetic circuit becomes so high, that the attractive force produced by the solenoid current is unable to overcome the force of spring 39 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 52 which shunts the solenoid 48 and prevents the induced voltage from damaging tranistor $Q_2$. The current in the solenoid however, rapidly decays to the point where the magnetic induction is so reduced that the force of attraction of the pole-piece on the keeper is equal to the spring force urging separation. At this point, there is an initial movement of keeper 50 as the closing blade is drawn toward unblocking position by the spring bias. The time between the instant that the current in transistor $Q_2$ is rapidly reduced and the instant that release of the closing blade is accomplished is very small in terms of the ordinary exposure interval, being only a fraction of a millisecond. For this reason, it is considered that the conduction of transistor $Q_2$ is reduced, and movement of the closing blade begins at substantially the same time. For the reasons set forth above, namely rapid switching of the current input to the solenoid and low power consumption, shutter timing apparatus 51 comprises a transistorized, two-stage, modified Schmitt-type trigger circuit 53, responsive to the output voltage from network 7, for controlling the actuation and deactuation of shutter operator means 46. The voltage sensitive trigger circuit 53 has a normally nonconducting stage that includes transistor $Q_1$ preferably of a silicon type, having base, collector and emitter electrodes 60b, 60c and 60e respectively. The collector electrode 60c of transistor $Q_1$ is connected to terminal 57 of the shutter timing apparatus by variable bias resistor 62, and emitter electrode 60e of transistor $Q_1$ is connected to terminal 69 of the shutter timing apparatus by variable bias resistor 63. The normally conducting stage of circuit 53 includes transistor $Q_2$ having base, collector and emitter electrodes 64b, 64c and 64e. Collector electrode 64c is connected to terminal 57 through solenoid 48 so that the latter is energized when $Q_2$ conducts. Base electrode 64b of transistor $Q_2$ is connected to collector electrode 60c of transistor $Q_1$ through lead 65, and emitter electrode 64e of $Q_2$ is connected through bias resistor 63 to terminal 58. It should be noted that with this arrangement there is essentially a common emitter resistor, the adjustment to resistor 63 being for the purpose of establishing the voltage at which it is desired to trigger circuit 53. While the two stages of circuit 53 have been characterized as "normally nonconducting" and "normally conducting" it should be obvious that this characterization is applicable only when a potential source is applied across terminals 68 and 69.

In order to apply potential source 66, shown in the form of a battery of potential $E_0$ connected from terminal 68 to terminal 69 through normally open switch $S_1$, in such a way as to minimize current drain on the battery, actuator lever 34 (see FIG. 2) is provided with switch operating arm 67 that is engageable with one of the contacts of switch $S_1$. When the lever is manually depressed to disengage coupling means 32 from opening blade 29, the contacts of switch $S_1$ are closed.

Figure 6:
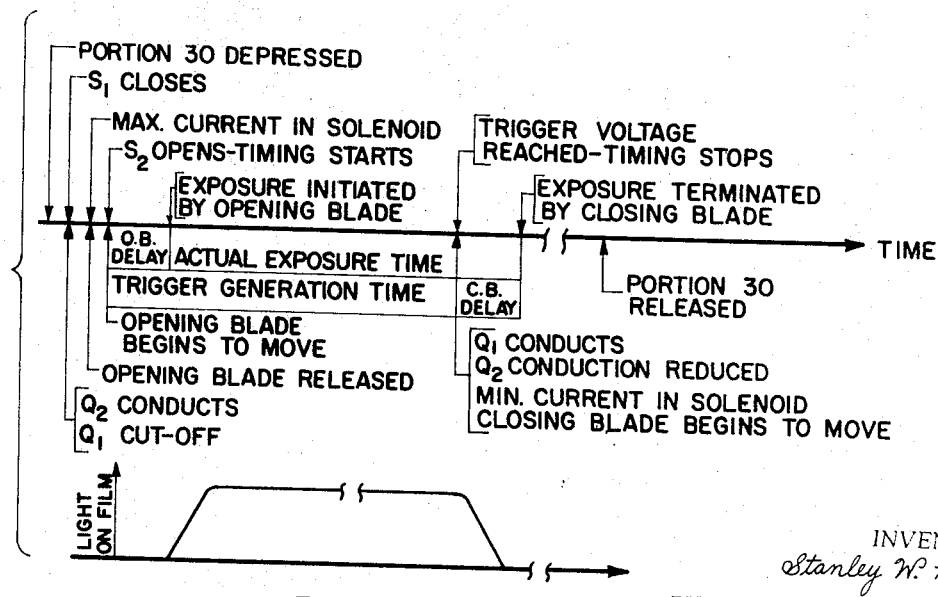
FIG. 6 is an expanded time-scale diagram for the purpose of illustrating the chronology of events associated with effecting exposure utilizing the camera of FIG. 2 and the electrical system of FIG. 1.

The sequence of events that occur as a result of the depression of end portion 40 will now be explained by making reference to the expanded time-scale diagram shown in FIG. 6. The initial depression of portion 40 closes the contacts of $S_1$ before the rotation imparted to lever 34 effects its disengagement from pin 36. Since human reaction time involved in depressing lever 34, namely the time to depress the lever and release it, and the inertial delay of the lever in returning to its normal position, substantially exceeds the longest average exposure apt to be used under normal conditions of scene brightness, the contacts of switch $S_1$ are closed for at least as long as the correct exposure time.

Inspection of transistor $Q_2$ stage of circuit 53 indicates that base electrode 64b, as shown FIG. 2, is the input to this stage, collector electrode 64c is the output, and emitter electrode 64e is common to the input and output. Resistor 62 coupled between input electrode 64b and terminal 68 acts as a fixed base resistor for providing, when $S_1$ is closed, a fixed base current bias that causes transistor $Q_2$ to conduct instantaneously with the closing of $S_1$. The setting of variable resistor 62 establishes the degree to which transistor $Q_2$ conducts so that the current through solenoid 48 can be adjusted to provide the proper magnetomotive force in the magnetic circuit of electromagnet 47 for preventing accidental release of closing blade 30 when the opening blade moves to unblocking position to initiate exposure. The flow of current through resistors 62 and 63, when transistor $Q_2$ conducts, establishes at the collector and emitter electrodes of $Q_1$, bias voltages having first values dependent upon the magnitudes of the respective currents and resistance valves.

Until the initial displacement of the opening blade out of its blocking position, conductive block 84 on the opening blade engages the contacts of $S_2$ whereby the latter is closed. Connection 61 is at an initial value of voltage, namely ground potential, at the instant $S_1$ is closed. When the voltage at connection 71 is at its initial value, and the voltages at the collector and emitter electrodes of transistor $Q_1$ are at their first values of bias voltage due to the conduction of $Q_2$, the collector-base and emitter-base junctions of transistor $Q_1$ are reverse biased, thus resulting in transistor $Q_1$ being cut off. For this reason, it may be said that the bias of transistor $Q_1$ is primarily established by the voltage at terminal 61.

Meanwhile, the current through the solenoid builds rapidly to its maximum value causing the maximum retaining force to be exerted on the closing blade shortly after $S_1$ is closed and just prior to the total disengagement of lever 34 from pin 36 which releases the opening blade for movement out of blocking position. The initial movement of the opening blade causes conductive block 84, FIG. 5, to disengage the contacts of $S_2$ thereby opening the same to apply the voltage source across timing network 7 and activate the same. Network 7 includes capacitor means C in series with a smaller network 7 of four individual photoconductive elements 17, 18, 19 and 20 such as cadmium sulfide photocells or the like and connected together in a manner which will be described in detail later in the specification. Network 7 is connected between terminals 68, 69 of the shutter timing apparatus so as to form a conventional integrator circuit whose input terminal is at 68, and whose output terminal is at 71, the connection between the capacitor means and the photoconductive element. Terminal 71 is connected by fixed impedance 70 to base electrode 60b of transistor $Q_1$, the latter electrode constituting the input electrode of that stage.

The opening of $S_2$ activates network 7 which is to say that the latter is caused to generate, at connection 61, a voltage having an initial value (in this case ground potential) which causes transistor $Q_1$ to be reversed biased to cut-off, and then changes with time reaching a preselected value, termed the trigger voltage, which forward biases transistor $Q_1$, in a period of time termed the trigger generation time.

When the voltage at connection 71 reaches the trigger voltage, it causes the emitter-base junction of transistor $Q_1$ to be forward biased. Now, network 7 functions like a base resistor whose value is dependent upon the level of scene brightness and provides base current bias that causes transistor $Q_1$ to conduct producing collector current at the output electrode thereof which flows through resistor 62 increasing the voltage drop thereacross and lowering the voltage at the input electrode of $Q_2$. This reduces the forward bias on $Q_2$ thus decreasing the flow of current through the latter and causing a reduction in the voltage drop across bias resistor 63 thereby increasing the forward bias on transistor $Q_1$ even more. This regenerative feedback between the stages of voltage sensitive trigger circuit 53 will cause conduction to switch rapidly from transistor $Q_2$ to transistor $Q_1$, if sufficient collector current is available in transistor $Q_1$. Assuming this is true, the different flows of current through bias resistors 62 and 63 after switching takes place, establish second values of bias voltages at electrodes 60c and 60e of transistor $Q_1$ such that the conduction of transistor $Q_2$ is severely and rapidly reduced thereby rapidly de-energizing solenoid 48 to effect a sharp release of the closing blade. When the closing blade is released it begins to move out of unblocking position, and will terminate exposure at its blocking position as explained previously. Thus, the shutter means terminates exposure in response to deactuation of the shutter operator means.

As described above network 7 includes capacitor means C in series with a smaller network of four individual photosensitive elements 13, 14, 15 and 16 such as cadmium sulfide photocells or the like the cells being arranged to receive light in the daylight mode from four substantially separate portions of the scene to be photographed as illustrated in FIG. 1. The camera lens 72 is shown schematically as receiving light from the entire scene 73. The photocells may be arranged in a rectangle and the conductive means 75 and 76 provide series connections between the pairs of diagonally located photocells and conductive means 77 and 78 provide parallel connections between both diagonal pairs. As shown in perspective in FIG. 3 behind the imaging element 8 the photosensitive elements are not necessarily entirely separate elements but may for example be in the form of photoresistive areas 80, 81, 82 and 83 on a conductive circular plate 91 as shown connected together in the aforementioned series-parallel arrangement.

Also shown in FIG. 1 is a cam means 85 and springs 86 and 87 which cooperate with the extension 88 connected to optical element 8 to provide a means for selectively positioning either the relatively long focal length lens 9 or the relatively short focal length lenses 13, 14, 15 and 16 in front of the photocells upon insertion of the flashplug 90. Thus the imaging means 8 and the network 7 are automatically shifted between the daylight and the flash mode by the insertion and removal of the flashgun plug 90 in its socket.

As referred to previously, photodiodes may be utilized as the photosensitive elements in the exposure control circuit. For example, a silicon photodiode may have segmental areas, responsive to light from separate portions of the scene being photographed, etched on the surface of the chip thereof and connected in the aforesaid daigonal sensing series-parallel type network.

While the preferred embodiment of the invention includes a series-parallel arrangement of four photosensitive elements it is possible to obtain acceptable exposure control with just a pair of series connected photosensitive elements each responsive to diagonally opposite portions of the scene being photographed in the daylight mode, for example, and to the entire scene in the flash mode. In such a case the imaging means for the system could comprise a similar molded element with the relatively larger lens on the front surface thereof but with only two smaller lenses on the rear face which are positioned over the photosensitive elements in the flash mode.

While the imaging means is shown as a unitary molded transparent element it is also apparent that it could include separate lenses mounted in holding means to accomplish the same result.

To exclude stray light in all embodiments, it is also contemplated that the area outside that which the image light rays pass through may be masked either by a separate cooperating masking element or, for example, by optical black applied to the faces of optical imaging element 8.

Since certain changes may be made in the above device without departing from the scope of the invention herein involved, it is intended that all matter contained in the above description or shown in the accompanying drawings shall be interpreted as illustrative and not in a limiting sense.

I claim:

1. Exposure control means for use on a photographic camera for photographing scenes lighted by either daylight in a daylight mode or by dynamic illumination such as a flashbulb in a flash mode comprising:

a plurality of photosensitive elements responsive to the light from various portions of the scene to be photographed, said photosensitive elements being incorporated in an electrical exposure control circuit including a source of potential;

means for connecting at least two of said photosensitive elements in a series connected pair in said electrical circuit;

light-imaging means for directing light from the scene to be photographed to said photosensitive elements, said means comprising an optical element having a front surface and a rear surface, a relatively long focal length on the front surface thereof which when positioned in front of said photosensitive elements in the daylight mode images the entire scene to be photographed on the elements collectively so that each element receives an equal portion of said scene image and a plurality of relatively short focal length lenses on the rear surface of said optical element which when positioned in front of said photosensitive elements in the flash mode images said entire scene to be photographed on each element individually so that each photosensitive element receives light from said entire scene image; and means for shifting the relative position of said light-imaging means and said photosensitive elements to select either the daylight or flash mode.

2. The combination of claim 1 wherein the thickness of said optical element is considerably larger than the radius of curvature of any of said lenses.

3. Exposure control means for use on a photographic camera for photographing scenes lighted by either daylight in the daylight mode or by dynamic illumination such as a flashbulb in a flash mode, comprising:

a plurality of photosensitive elements responsive to the light from various portions of the scene to be photographed, said photosensitive elements being incorporated in an electrical exposure control circuit including a source of potential;

means for connecting at least two of said photosensitive elements in a series connected pair in said electrical circuit;

light-imaging means for directing light from the scene to be photographed to said photosensitive elements, said means comprising a transparent relatively thick optical element having a relatively long focal length lens on a front surface thereof and a plurality of relatively short focal length lenses on a back surface thereof, each of said lenses forming an image in a single plane spaced from the rear surface of said optical element by a distance less than the thickness of said optical element, the relatively long focal length lens when positioned in front of said photosensitive elements in the daylight mode imaging the entire scene to be photographed on the elements collectively so that each photosensitive element receives an equal portion of said scene image and the plurality of relatively short focal length lenses on the rear surface of said optical element when positioned in front of said photosensitive elements in the flash mode imaging said entire scene to be photographed on each element individually so that each photosensitive element receives light from said entire scene image; and means for shifting the relative positions of said light-imaging means and said photosensitive elements to select either the daylight or flash mode.

4. The combination of claim 3 wherein the thickness of said optical element is considerably larger than the radius of curvature of any of said lenses.

5. Exposure control means for use on a photographic camera for photographing scenes lighted by either daylight in a daylight mode or by dynamic illumination such as a flashbulb in a flash mode, comprising:

a plurality of photosensitive elements responsive to the light from various portions of the picture area, said photosensitive elements being incorporated in an electrical exposure control circuit including a source of potential;

means for connecting at least four of said photosensitive elements in at least two series connected pairs in said electrical circuit and means connecting at least one of said series connected pairs in parallel with at least another pair of series connected photosensitive elements in said electrical circuit;

light-imaging means for directing light from the scene to be photographed to said photosensitive elements, said means comprising a unitary molded transparent element having a front surface and a rear surface, a relatively long focal length lens on the front surface thereof adjacent one end which when positioned in front of said photosensitive elements in the daylight mode images the entire scene to be photographed on the four elements collectively so that each element receives one quarter of the light of said entire scene image and four relatively short focal length lenses adjacent the other end of said molded element on the rear surface thereof which when positioned in front of said group of photosensitive elements in the flash mode images said entire scene to be photographed on each element individually so that each element receives light from said entire scene image; and means for shifting the relative positions of said light-imaging means and said photosensitive elements to select either the daylight or flash mode.

6. Light-imaging means for directing light from a scene to be photographed to a plurality of photosensitive elements connected in the exposure control circuit of a photographic camera, said photosensitive elements each having a light responsive surface lying in the same single plane, said light-imaging means comprising:

a unitary elongated molded transparent element having a front surface and a rear surface, a relatively long focal length lens on the front surface thereof for imaging the scene to be photographed in said single plane on the light responsive surfaces of said photosensitive elements so that each surface receives only a portion of the light of said scene image and a plurality of relatively short focal length lenses on the rear surface of said molded element for imaging the entire scene in said single plane on the light responsive surface of each of said photosensitive elements individually so that each photosensitive element receives light from said entire scene image.

7. Light-imaging means for directing light from a scene to be photographed to a plurality of photosensitive elements connected in the exposure control circuit of a photographic camera, said photosensitive elements each having a light responsive surface lying in the same single plane, said light-imaging means comprising:

a unitary molded transparent optical element having a front surface and a rear surface, a relatively long focal length lens on the front surface thereof for imaging the scene to be photographed in said single plane on the light responsive surfaces of said photosensitive elements so that each surface receives only a portion of the light of said scene image and a plurality of relatively short focal length lenses on the rear surface of said molded element for imaging the entire scene in said single plane on the light responsive surface of each of said photosensitive elements individually so that each photosensitive surface receives light from said entire scene image, the thickness of the optical element being such that the relatively long focal length lens on the front surface thereof is spaced the exact distance from the plurality of relatively short focal length lenses on the back surface so that the image formed by each lens is formed in said single plane.

8. Light-imaging means for directing light from a scene to be photographed to a plurality of photosensitive elements connected in the exposure control circuit of a photographic camera, said photosensitive elements each having a light responsive surface lying in the same single plane, said light-imaging means comprising:

a unitary molded transparent element having a first surface and a second surface, said first surface being formed having a plano portion and a portion defining a lens of relatively long focal length for imaging said scene at said plane of the light responsive surfaces of said photosensitive elements so that each surface receives only a portion of the light of said scene image, and said second surface being formed having a plano portion disposed opposite said first surface lens defining portion and additionally incorporating a plurality of relatively short focal length lenses opposite said first surface plano portion for imaging said scene in its entirety at said plane upon the light responsive surface of each of said photosensitive elements individually.

9. The light imaging means of claim 8 in which said first and second surfaces are spaced apart to provide an optical element thickness permitting the co-planar imaging of said relatively long focal length lens and said plurality of said relatively short focal length lenses.